Aug. 20, 1957 R. SARDESON ET AL 2,803,049
FILM CLIP
Filed March 17, 1952 2 Sheets-Sheet 1
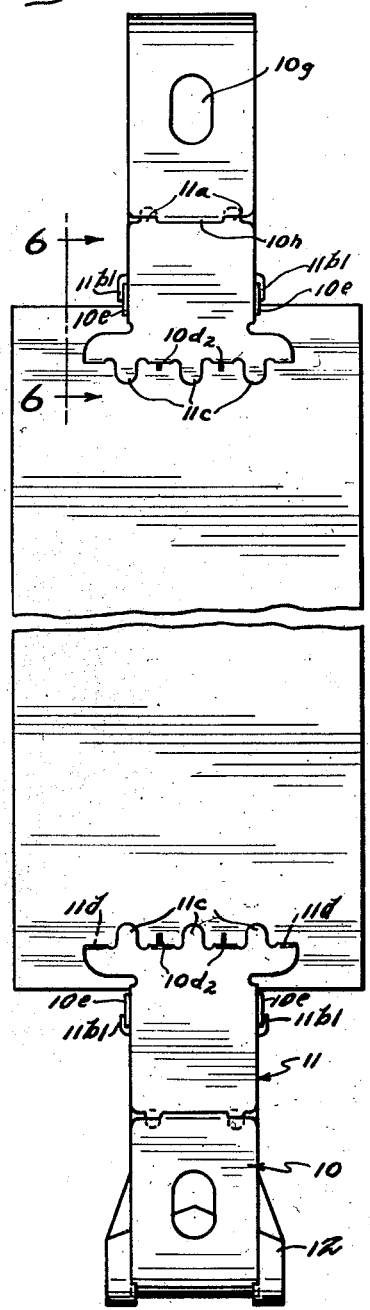
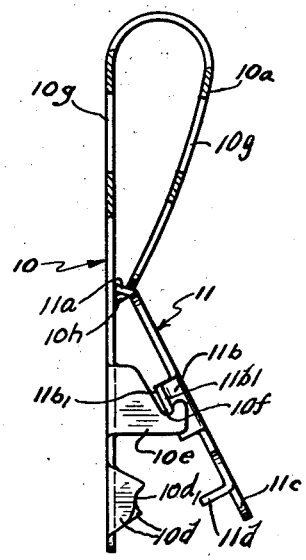
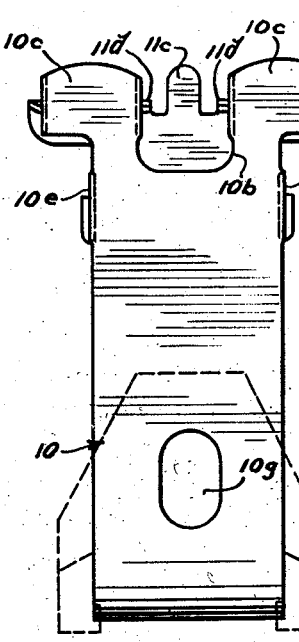
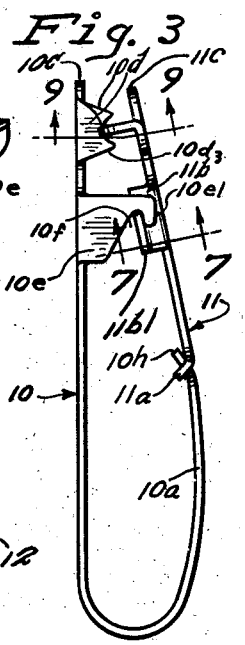
INVENTOR.
ROBERT SARDESON
CLARE K MILLER
BY Chas. C. Reif
ATTORNEY.

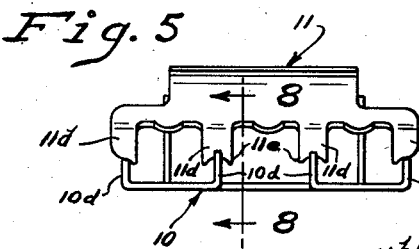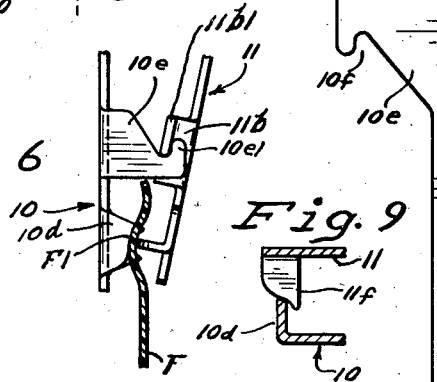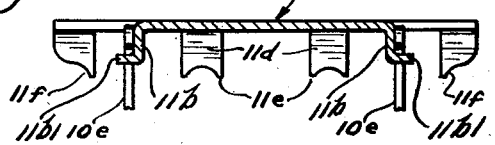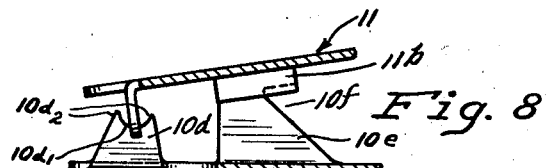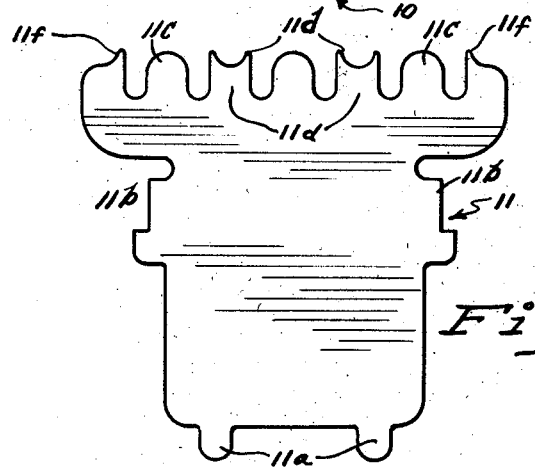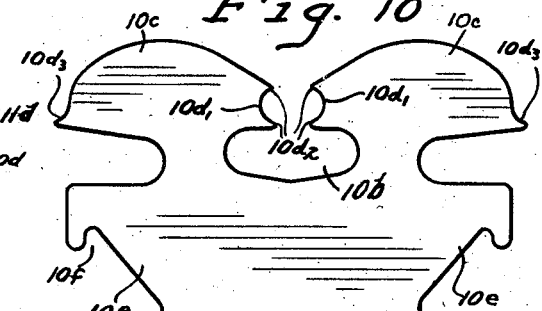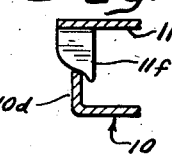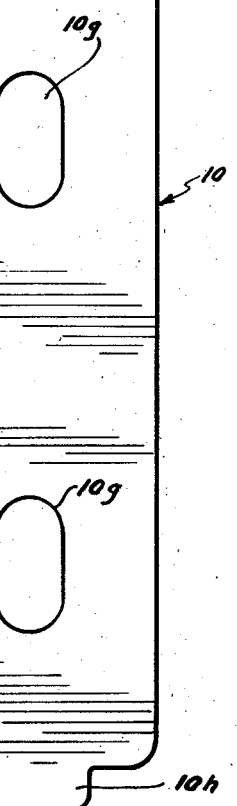

United States Patent Office 2,803,049
Patented Aug. 20, 1957

2,803,049

FILM CLIP

Robert Sardeson and Clare K. Miller, Minneapolis, Minn., assignors to Pako Corporation, Minneapolis, Minn., a corporation of Delaware Application March 17, 1952, Serial No. 276,975

10 Claims. (Cl. 24—252)

This invention relates to a clip for holding sheet material, and while the same may have various applications, it has been particularly designed to hold such sheet material as photographic films. As is well known to those skilled in the art, an immense number of photographic films after being developed, fixed and washed, are suspended for drying. The film is commonly held and suspended from a film clip which engages its upper end. It is also a common practice to have a weight connected to the lower end of said film by a film clip to hold the film steady and in vertical position.

It is an object of this invention to provide a film clip made of two pieces of sheet material, one of which is resilient and has one end portion reversely bent and pivotally connected to the other member, said members having at their other ends film-engaging portions.

It is also an object of the invention to provide such a film clip as set forth in the preceding paragraphs, said other member constituting a lever which fulcrums on said first mentioned member, the connected ends of said bent portion and said other member being movable toward said first mentioned member with an over-center action, said clip thus having a severe gripping tension when in film-gripping position but having a lesser tension when in said over-center and open position.

It is also an object of the invention to provide such a structure as set forth in the preceding paragraphs, said members being capable of being so constructed that said clip will remain in open position when moved to said over-center position.

It is a further object of the invention to provide a film clip made of two pieces of sheet material so bent and connected that no spring is necessary or used and no riveting or welding necessary in its construction.

Another object of the invention is to produce a film clip having a plurality of pairs of crossed gripping portions or pairs of grippers which are in planes at right angles to each other and in which a portion of each individual gripper supports the film so that another portion of the mating gripper may pierce or indent said film.

When long films are suspended they have a tendency to curl, and it is an object of this invention to provide a film clip having crossed gripping jaws or gripping jaws disposed respectively in planes at right angles to each other so that said jaws form a curved trough extending crosswise of the film and greatly reducing the tendency of the film to curl.

It is still another object of the invention to provide a film clip having members carrying respectively film-gripping portions, said portions being so constructed as to have a very small area of horizontal surface which could act to carry water or photographic solutions from one bath to another. Any water carried on the clip delays the drying operation and often runs down upon the film and causes streaks thereon so the water-carrying surfaces are reduced to a minimum.

It is still another object of the invention to provide a film clip having relatively movable members with film-engaging portions, said portions being constructed to provide easy entrance of the film therebetween and being provided with downwardly extending projections with substantially pointed ends so that water will drop off of said projections and the projections form guards to keep the fingers of the operator from getting between the sharp parts of the film-holding portions.

It is more specifically an object of this invention to provide a film clip comprising a member of resilient sheet material having one end portion reversely bent on a curve, a second member preferably of sheet material having one end pivotally connected to the end of said bent portion, said members having film-engaging portions at their other ends and said first mentioned member and its reversely bent portions having apertures for receiving a supporting member or rod and being constructed so that a lead weight may be easily carried thereby.

These and other objects and advantages of the invention will be fully set forth in the following description made in connection with the accompanying drawings in which like reference characters refer to similar parts throughout the several views and in which:

Fig. 1 is a view in front elevation showing a film clip of this invention from which a film is suspended, together with a weighted film clip of this invention connected to the lower end of said film;

Fig. 2 is a view in side elevation of a film clip of this invention shown in open position;

Fig. 3 is a view in side elevation of a film clip of this invention shown in closed position;

Fig. 4 is a view in rear elevation of a film clip of this invention as seen from the side opposite that shown in Fig. 1;

Fig. 5 is a view in end elevation of the clip as seen from the film-engaging end;

Fig. 6 is a partial view in side elevation of the clip showing a portion of the film engaged between the jaws thereof, as would be seen from line 6—6 of Fig. 1;

Fig. 7 is a transverse section taken on line 7—7 of Fig. 3, as indicated by the arrows showing only the parts adjacent said line;

Fig. 8 is a vertical section taken on line 8—8 of Fig. 5, as indicated by the arrows;

Fig. 9 is a partial transverse section taken on line 9—9 of Fig. 3, as indicated by the arrows;

Fig. 10 is a plan view of the blank used in making one of the members of said clip; and Fig. 11 is a plan view of the blank for the other member of said clip.

Referring to the drawings, a clip for holding sheet material is shown comprising a main member 10 which will be formed of resilient sheet material, and while different materials might be used, in practice a resilient sheet of steel has been used. Member 10 has one end portion 10a thereof reversely bent on a curve so that the end portion of portion 10a lies in a plane substantially parallel to the unbent portion of main member 10. Member 10 has adjacent its other end a notch 10b formed therein so that said member has spaced parts or extensions 10c which lie in the flat plane of main member 10. Parts 10c have their edge portions bent at right angles to form spaced gripping lugs 10d. These lugs 10d extend toward the general plane of bent part 10a. The lugs 10d adjacent each other have recesses 10d1 therein formed substantially on the arc of a circle. Recesses 10d1 thus form spaced tooth-like terminal portions 10d2 having very short terminal rectilinear edges. The lugs 10d at the outer sides of portions 10c have portions cut from their ends to form a projection or tooth 10d3 at the inner end of said lugs, the outer terminal end of said lugs being formed on a curve.

Member 10 has fulcrum portions 10e disposed some distance inwardly from portions 10c, and these are bent at right angles, as shown in Fig. 8. Said portions 10e form fulcrum lugs and these fulcrum lugs have recesses 10f formed therein which are substantially semi-circular in shape, and these form the ends or tongues 10e1 at the outer ends of lugs 10e, which tongues are shown as having semi-circular ends. Plate 10 adjacent its bent portion is provided with a pair of aligned openings 10g of oblong form.

A second lever member 11 is provided which is preferably of sheet material, such as steel, and the same is pivotally engaged at one end with the free end portion of portion 10a. Portion 10a is cut away at its sides to form an elongated hinge lug 10h at its end. Member 11 is cut away adjacent its sides and central portion to form a pair of spaced narrow cooperating hinge lugs 11a. Lugs 10h and 11a are bent relatively to portions 10a and 11 at a substantial angle, as shown in Figs. 2 and 3. Member 11 has intermediate its ends a pair of cooperating fulcrum lugs 11b bent at substantially right angles to the plane of said member and then again bent outwardly substantially at right angles to form hook-like portions 11b1, as shown in Fig. 7. Member 11 is also provided at its ends with spaced projecting lugs or tabs 11c which have rounded and substantially circular outer ends. At the sides of members 11c member 11 is provided with cooperating gripping lugs 11d bent at right angles thereto which form gripping teeth. The two inner lugs 11d are substantially rectangular in form but have semi-circular recesses in their terminal ends thus forming spaced teeth 11e at their edges respectively. The outer lugs 11d are cut away somewhat at their ends and thus have one tooth 11f at their inner edges.

The member 11 is interlocked with, hinged to, or swingingly connected to the portion 10a, as shown in Figs. 1 and 2, and a hinge lug 10h is held between the cooperating hinge lugs 11a so that portion 10a and member 11 which are shown as of the same width are held in perfect longitudinal alignment. Portions of lugs 11b adjacent member 11 are now disposed between the lugs 10e on member 10 and the portions 11b1 are disposed in the bight of the recesses 10f respectively. Member 11 is under stress tending to move it away from portion 10a so that when assembled, as described, portions 11b1 are held in the recesses 10f. The assembled clip is thus held very securely in assembled position and can only be disassembled with considerable effort. As shown in Figs. 1 and 4, the clip can easily be provided with a weight, such as a lead weight 12. This weight fits nicely in the bight portion of the bend in member 10 and has projections which embrace said bight portion so that the weight is held securely in position in the clip.

In operation, the operator will hold the end portion of the film in one hand, usually the left hand, and will press upon the member 10 and the member 11 adjacent the connected end of the latter and the clip will then be moved to open position with the gripping portions separated. The operator will now move the film between the jaws and it will move back until it engages the sides of the lugs 10e. This gives the proper amount of distance between the end of the film and the point engaged by the gripping teeth. When in open position, as shown in Fig. 2, the lever 11 is flexing the bent end portion 10a. The operator now pushes upon the outer end of member 11 and said end now moves toward the film-engaging portions on member 10 with a decided snap. This closing motion is quite vigorous and member 11 has sufficient force to cause the teeth thereon to pierce or indent the film. This gives a very positive grip. The projections 10c and 11c will be engaged by the operator's fingers and he will thus be prevented from getting his fingers between the teeth or film-gripping portions. Said projections thus form guards and greatly reduce the liability of accident.

From the above description it will be seen that we have provided a very simple and yet highly efficient film clip.

By varying slightly the relative lengths of member 11 and portion 10a the clip can be made to remain in open position after being opened or it can be made so that it will close upon release of finger pressure. When made in either manner the clip can be held in open position for some time with little fatigue while the operator is loading film in complete darkness. The parts 10a and 11 and the connected end portions thereof are moved to an over-center position when the clip is in open position. There is thus much less closing force on said parts when in open position than when the clip is in closed position. When proportioned so as to remain open the over-center action is very pronounced.

It will be noted that the clip is produced and the gripping action had without the use of any separate spring. There is also no riveting necessary. Only two pieces are necessary and these can be formed and bent to the required form in a dieing operation. As stated, the interengaging lugs on member 11 and portion 10a hold the two parts in accurate alignment. It will be noted that the gripping portions are crossed or disposed at right angles to each other. The lugs on member 10 support the film while the teeth on member 11 can pierce or indent the film. Both portions act to have a forcible bite on the film. The crossed gripping portions form a curved end trough F1 the film F adjacent the end thereof and extending crosswise thereof, as shown in Fig. 6. This reduces the tendency of the films to curl, as above pointed out. The end projections 10c and 11c on members 10 and 11 are shaped so that the water will readily drip therefrom. As stated, there is very little horizontal surface to retain water. As described, the film can be very readily provided with a lead weight.

The device has been amply demonstrated in actual practice, found to be very successful and efficient and commercial production is in progress.

It will of course be understood that various changes may be made in the form, details, arrangement and proportions of the parts, without departing from the scope of applicants' invention, which generally stated, consists in a device capable of carrying out the objects above set forth, in the parts and combinations of parts disclosed and defined in the appended claims.

What is claimed is:

1. A film clip having in combination, a main member of resilient sheet material having one end portion bent on a curve throughout substantially 180 degrees and having a hinge lug formed at the end of said portion, said lug being bent at an obtuse angle toward the unbent portion of said member, a second member of sheet material having a pair of cooperating hinge lugs at one end bent at an acute angle toward said unbent portion, said first mentioned lug fitting between said pair of lugs, said lugs on said respective members diverging from each other toward their free ends, interengaging fulcrum and cooperating fulcrum lugs on the unbent portion of said first mentioned member and said second member respectively and film-gripping portions at the other ends of said members respectively, said second member being swingable on said interengaging lugs.

2. A film clip having in combination, a main member of resilient sheet material having one end portion bent on a curve through substantially 180 degrees, said member having spaced film-holding portions spaced from its other end, a lever of sheet material swingingly connected at one end to the end of said bent portion so as to swing about an axis extending transversely thereof and having spaced teeth spaced from its other end cooperating with said film-holding portions respectively, said lever being fulcrumed intermediate its ends on the unbent portion of said main member, said film-holding portions and teeth being held in engagement by the resiliency of said bent portion of said main member.

3. The structure set forth in claim 2, said member having lugs at the sides of its unbent portion and said lever having lugs at its sides, said latter lugs engaging said first mentioned lugs and being fulcrumed thereon.

4. A film clip having in combination, a member of resilient sheet material having one end portion bent on a curve through substantially 180 degrees, said member having transversely spaced film-gripping portions spaced from its other end and having spaced fulcrum portions spaced from said last mentioned portions disposed in planes at right angles to the plane of the other end of said member and extending longitudinally thereof, said fulcrum portions having recesses therein, a second member of sheet material swingingly connected at one end to said bent portion at the free end thereof and having fulcrum lugs thereon arranged to cooperate with said fulcrum lugs disposed in said recesses respectively and held therein by pressure caused by the stress of said bent portion, said second member having spaced teeth at its other end cooperating with said film-gripping portions to hold a film.

5. A film clip having in combination, a member of resilient sheet material having one end which is its upper end portion when a film depends therefrom bent on a curve through substantially 180 degrees and having transversely spaced film-gripping portions spaced slightly from its other and lower end, said bent member thus having long and short portions, said short portion having a free end, a lever of sheet material swingingly connected to said free end of said short portion and having teeth at its other and lower end cooperating with said film-gripping portions, said first mentioned member having portions on which said lever is fulcrumed, said lever having spaced terminal projections with downwardly converging edge portions at said lower end from which water will drop.

6. A film clip having in combination, a plate-like member of resilient material bent on a curve throughout substantially 180 degrees to form a longer portion and a shorter portion and having spaced film-gripping teeth adjacent its longer end, a second plate-like member swingably connected at one end to the free end of said shorter portion and fulcrumed on the said longer portion of said first mentioned member, said second member having gripping teeth on its other end cooperating with said gripping teeth, said second member being urged to gripping position by the resiliency of said shorter portion due to said bending and said bent portion and one end portion of said second member being manually movable toward said longer portion of said first mentioned member to swing said lever and move said film-gripping portions and teeth away from each other.

7. A film clip having in combination, a member of resilient sheet material having one end portion bent on a curve through substantially 180 degrees, said bent portion constituting a short part and the unbent portion a longer part, said longer part at its other end having spaced portions bent at right angles thereto and having recesses in their ends forming gripping teeth at each side of said recesses respectively, a second member swingingly secured to the free end of said short part and fulcrumed on said longer part to swing about an axis extending transversely thereof and the same having adjacent it free end spaced portions bent at right angles thereto and having recesses in their ends, said recesses forming teeth at each side of said last mentioned portions respectively, said first mentioned teeth and second mentioned teeth being respectively opposed and offset and in planes at right angles to each other, the same forming pairs of film-gripping teeth, the midpoints of said recesses in each of said pairs being in alinement in film-gripping position, whereby the film will be engaged at four points by each of said pairs, the free end of said second member being urged toward said longer part to move said teeth into engagement with said film by the resiliency of said short part.

8. A film clip having in combination, a member of resilient sheet material having one end portion bent on a curve throughout substantially 180 degrees thus forming a long portion and a short portion spaced therefrom, said long portion having transversely spaced film-gripping portions adjacent its other end, a lever of sheet material swingingly connected at one end to the free end of said short portion and having film-gripping teeth at its other end arranged to cooperate with said film-gripping portions, said long portion having parts on which said lever is fulcrumed, said short portion having a central lug at its free end, said lever having spaced lugs at its connected end disposed respectively at each side of said central lug, said central lug and spaced lugs forming the connecting means for said lever and short portion, the resiliency of said short portion acting on said lever to normally hold said film-gripping portions and said teeth in film-clamping position, said short portion being movable toward said long portion under pressure to separate said teeth and film-gripping portions.

9. A film clip having in combination, an elongated member of resilient material having one end portion bent on a curve throughout substantially 180 degrees and thus having a longer portion and a shorter portion, said longer portion having transversely spaced film-gripping means spaced a short distance from its other end, a lever of sheet material swingingly connected at one end to the end of said shorter portion, said lever having teeth at its other end cooperating with said film-gripping means, said first mentioned member having portions thereon in which said lever is fulcrumed, said lever having spaced narrow portions projecting from said other end having rounded lower ends so that water will readily drop therefrom, said film-gripping portions lying in vertical planes when in film-supporting position so as to have a minimum water holding effect, said shorter portion forming a spring acting to urge the connected end thereof away from said longer portion and swing said lever to bring the teeth thereon into gripping position with said film-gripping means.

10. A film clip having in combination, a pair of swingingly connected members having end portions movable toward and from each other, one of said members having a planar gripping lug at said end portion, said lug having a recess in its end edge forming teeth at each side of said recess, the other of said members having a cooperating planar gripping lug disposed in a plane at right angles to said first lug and in opposed relation thereto and having a recess in its end forming teeth at either side of said recess, the bottoms of said recesses being substantially in engagement when said lugs are in gripping position and said teeth then piercing the gripped film from opposite sides respectively.

References Cited in the file of this patent

UNITED STATES PATENTS

| | | |
|---|---|---|
| 409,833 | Eiseman | Aug. 27, 1889 |
| 632,483 | Weston | Sept. 5, 1899 |
| 966,325 | Gilbert | Aug. 2, 1910 |
| 1,053,725 | Gates | Feb. 15, 1913 |
| 1,408,448 | Durst | Mar. 7, 1922 |
| 1,410,950 | Norman | Mar. 28, 1922 |
| 1,660,078 | Leeper | Feb. 21, 1928 |
| 1,687,581 | Murphy | Oct. 16, 1928 |
| 2,153,853 | Vaughan | Apr. 11, 1939 |
| 2,370,434 | Wolf | Feb. 27, 1945 |
| 2,455,627 | Uhlmann | Dec. 7, 1948 |